United States Patent [19]

Pearlman

[11] 3,968,313

[45] *July 6, 1976

[54] SURFACE TREATMENT

[76] Inventor: Martin B. Pearlman, 78-05 141 St., New York, N.Y. 11367

[ * ] Notice: The portion of the term of this patent subsequent to Mar. 12, 1992, has been disclaimed.

[22] Filed: Dec. 27, 1973

[21] Appl. No.: 428,701

Related U.S. Application Data

[63] Continuation-in-part of Ser. No. 141,929, May 10, 1971, Pat. No. 3,796,608, which is a continuation-in-part of Ser. No. 630,187, April 12, 1967, Pat. No. 3,578,508.

[52] U.S. Cl. .......................... 428/450; 148/6.14 R; 148/6.27; 428/457

[51] Int. Cl.² ...................... B32B 9/06; B32B 15/04

[58] Field of Search ...................... 148/6.14 R, 6.27; 117/135.1; 427/435; 428/450, 464, 411, 457

[56] References Cited

UNITED STATES PATENTS

| | | | |
|---|---|---|---|
| 566,037 | 8/1896 | Thompson | 148/6.14 R |
| 2,146,838 | 2/1939 | Newsome et al. | 148/6.27 |
| 2,146,840 | 2/1939 | Newsome et al. | 148/6.27 |
| 2,818,079 | 12/1957 | Garrison | 148/6.14 R |
| 3,796,608 | 3/1974 | Pearlman | 148/6.14 R |

OTHER PUBLICATIONS

Koziejowska, K., *Effect of Hydrogen Ion Concentration on the Extraction of Tannins From China Bark* (*Quillata*), In Chemical Abstracts, 72:6216h, 1970.

*Primary Examiner*—Cameron K. Weiffenbach
*Attorney, Agent, or Firm*—Abner Sheffer

[57] ABSTRACT

Treatment of metals, and other surfaces, with dilute colloidal slightly acidic dispersion of silica and tannin. The treating composition is removed from the metal surface before forming any deposit of silica visible to the naked eye. The metals become resistant to chemical attack.

10 Claims, No Drawings

SURFACE TREATMENT

CROSS REFERENCES TO RELATED APPLICANTS:

This application is a continuation-in-part of my application Ser. No. 141,929 filed May 10, 1971, now U.S. Pat. No. 3,796,608, which is a continuation-in-part of application Serial No. 630,187 filed Apr. 12, 1967, now U.S. Pat. No. 3,578,508. The entire disclosures of said patents are incorporated by reference.

BRIEF SUMMARY OF THE INVENTION:

Metal surfaces are treated to improve their resistance to chemical attack, such as corrosion, with a colloidal dispersion of silica and tannin, preferably in combination with a surfactant such as a saponin. The treating composition is removed from the metal surface before forming any deposit of silica visible to the naked eye.

DETAILED DESCRIPTION

In accordance with one aspect of this invention metals are made resistant to corrosion and to chemical attack by depositing an adsorbed layer of silica thereon. This may be accomplished by treating their surfaces with a dilute slightly acidic colloidal aqueous dispersion of silica. Various techniques for making colloidal aqueous dispersions of silica are well known in the art. It is convenient to employ dispersions made by simply treating finely divided silica (e.g. ground quartz) with water. The dispersion is preferably quite dilute. Desirably it should not be so concentrated as to yield, on contact with the metal, a deposit distinctly visible to the naked eye.

The metal treatment process of this invention has resulted in the production of metallic surfaces which are bright and uncolored and which seem to the naked eye to be uncoated. Evidently the deposited material on the metal constitutes at most a very thin and transparent layer much thinner than 0.001 inch. Hydrophobic surfaces which "shed" water and dilute sulfuric acid have been produced; this is surprising in view of the known hydrophilic nature of silica and it may be due to some combination with organic material, such as organic hydroxyl compounds (e.g. alcohols such as polyhydric alcohols) that may be present on the surface of the metal or in the cleaning aids described below; this combination may be a physical codeposition on the surface or a chemical combination such as an esterification of hydroxyl groups attached to silicon atoms.

The metal treated may, for instance, be any of the usual metals conventionally used for constructing and fabricating articles to be exposed to the atmosphere. I have thus far treated ferrous metal (e.g. steel), zinc, aluminum, copper and silver, all with successful results. The striking efficacy of the process is illustrated by the fact that it makes zinc resistant to dilute sulfuric acid.

The treated surface may be painted or otherwise coated in conventional manner, e.g. painted with the usual oil-based paints such as drying oil-modified alkyd resin paints, or electroplated with, say, brass, cadmium or chromium.

The metal treatment may also be applied to metals carrying coatings, such as paint or metal plating (e.g. chrome-plating) thereon to further protect the metal, e.g. by depositing the silica or silica-containing material at any of the exposed areas of base metal, such as at pinholes in the coating.

As indicated above, the treating liquid is preferably slightly acidic; generally its pH is above 5 and more usually above 6.

The silica dispersion is preferably applied to a clean metal surface. In one particularly preferred form of the invention, the silica dispersion is mixed with an aqueous cleaning solution. Particularly suitable is a dilute solution made from or containing molasses; for instance, a solution containing the glucose and fructose of blackstrap molasses, preferably together with a surfactant (emulsifying or wetting agent), may be used.

In one preferred form of the invention the silica dispersion is mixed with a solution containing a tannin, preferably in combination with a surfactant such as a "soap" produced from tree barks, preferably a saponin (see R. J. McIlroy The Plant Glycosides [London, 1951] Chapter IX). Extract of quillaja bark (also known as Panama bark, China Bark, Murilo Bark) containing quillaic acid, quillaja-saponin, sucrose and tannin is especially effective.

The period of treatment of the metal may be very short. For practical purposes periods of less than an hour (e.g. a few minutes or less) are preferred. The metal need merely be dipped in a bath of the treating solution, then removed from the bath and rinsed (as with water) and dried. The temperature of treatment is conveniently from, say, room temperature to the atmospheric boiling point of the treating solution, but it is within the broader scope of the invention to effect treatment at higher temperature such as may be obtained under superatmospheric pressures. Temperatures so high as to effect alloying and penetration of surface material into the body of the metal (as in commercial siliconizing) are not needed in my process.

The following Examples are given to illustrate this invention further. In the Examples as in the rest of the application, all proportions are by weight unless otherwise indicated. In the Examples, the pressure is atmospheric unless otherwise indicated.

Examples 1 - 14 are taken from application Ser. No. 141,929 now U.S. Pat. No. 3,796,608.

EXAMPLE 1

A colloidal dispersion of silica in water is made by treating finely divided highly pure silica flour (of a fineness to pass a 325 mesh U.S. Standard screen) with hot water, in this case water near its boiling point. This can be done on a small scale by percolating the hot water through a bed of the silica flour. In one experiment an ordinary clean 12 cup household coffee percolator is used (the percolator is made of pyrex glass, except for the perforated basket which is of aluminum and, for this experiment, is partially covered with filter paper to assist in retaining the silica in the basket. Into the percolator are placed 16 fluid ounces of water and (in the filter paper-lined basket) 25 grams of the silica flour. The percolator is heated to cause the water to boil and to be repeatedly driven up over and through the bed of silica flour; this is continued for about 40 minutes. The water becomes turbid (cloudy) and distinctly acidic (pH of 6.03).

The silica flour used above has the following analysis: 99.61% $SiO_2$, 0.05% ferric oxide, 0.19% alumina, 0.04% titania.

EXAMPLE 2

A particularly suitable cleaning solution for cleaning of metal surfaces during the corrosion-proofing treatment is made by dissolving 2 fluid ounces of blackstrap molasses in a quart of water at about 120°F, adding ¼ fluid ounce of methanol and allowing the mixture to stand, e.g., without heating or cooling, in a room at 75°F for about 5 days. During this period a precipitate, believed to be largely sucrose, is formed, owing in part at least to the effect of the methanol; also the mixture becomes quite odorous probably due to fermentation. The mixture is filtered (through filter paper) and 10cc of 40% formol is added thereto as a preservative. The resulting dark red brown mixture may be diluted with water considerably (e.g. a hundredfold) and used to clean metal in conjunction with the silica treatment.

EXAMPLE 3

In a particularly preferred form of the invention the cleaning and treatment are effected simultaneously. To a liter of hot water (at about 120°F) there are added 10cc of the cloudy liquid of Example 1 and 10cc of the liquid of Example 2. A piece of rolled mild steel, carrying an oily mill finish is then treated with this mixture by immersing the steel therein and leaving it there for a short period (e.g. about 1 to 10 minutes, for instance 2 minutes) at room temperature. The steel surface is then rinsed immediately with water and dried. To the naked eye the steel surface appears bright like clean steel but otherwise unchanged by this treatment. However, it is now highly resistant to atmospheric corrosion, highly resistant to attack by dilute sulfuric acid (e.g. it may be immersed for days or weeks in aqueous sulfuric acid of, say, 5 to 35% concentration without evidence of significant attack). It is also tested in 3M HCl solution and is found to resist attack by that solution. The corrosion resistant surface resists abrasion.

EXAMPLE 4

Example 3 is repeated except that the metal is aluminum. The metal appears unchanged to the naked eye but becomes resistant to attack by sulfuric acid, aqueous 4% NaOH solution and aqueous 4% $Na_2CO_3$ solution.

EXAMPLE 5

Example 3 is repeated except that the metal is a zinc sheet which has been rolled, using oil as the rolling lubricant. The metal appears bright like clean zinc but otherwise unchanged to the naked eye but becomes resistant to attack by sulfuric acid, aqueous 3M HCl, aqueous 4% NaOH solution and aqueous 4% $Na_2CO_3$ solution.

EXAMPLE 6

Example 3 is repeated except that the metal is copper. The treated metal is resistant to attack by sulfuric acid, aqueous 4% NaOH solution and aqueous 4% $Na_2CO_3$ solution.

EXAMPLE 7

A silver-plated table fork (which has been cleaned with silver polish and washed with soapy water and then rinsed with water and dried) is immersed for about 3 minutes in a mixture of 100 parts of water and one part of the cloudy acidic liquid produced in Example 1, then rinsed with water and dried. The resulting treated metal retains its silver appearance, is resistant to chemical attack, showing a very greatly reduced tendency to darken and tarnish on contact with sulfides, e.g. in use in contact with eggs or on standing, otherwise unprotected, in the atmosphere.

EXAMPLE 8

Example 1 is repeated using diatomaceous silica (Johns Manville Super-Cel Hyflo) in place of the silica flour. Similar results are obtained and the resulting liquid has similar effects on metals.

EXAMPLE 9

Example 1 is repeated but the silica flour is (a) mixed with the whole mass of water, in a pot, which is then heated to the boil and maintained at the boil for ½ hour, or (b) placed on a filter paper in a plastic funnel and leached with the same amount of water (about 30 parts of water per part of silica flour) using water at about room temperature; (the liquid passing through the filter is poured over the silica flour again, repeatedly, and this operation is continued for about 45 minutes); or (c) mixed with the whole mass of tap water (in a ratio of 35 parts of water per part of silica) in a pot, and allowed to stand for 24 hours, at room temperature and then filtered through filter paper. In each case a white cloudy acidic liquid is obtained, the pH values being (a) 6.35 (b) 6.26 and (c) 6.61, each liquid having very good metal protecting properties when used as in the foregoing Examples, although the liquid (c) is not as effective in the treatment.

EXAMPLE 10

50 grams of finely divided silica (crushed quartz) of size such that substantially all of it passes through a 200 mesh sieve is mixed with about 40 ounces of water and the mixture is heated at the boil in air for about 30 minutes (during which about 12 ounces of water evaporates) then cooled and filtered through filter paper. Sufficient tap water is then added to make the volume one quart and the cloudy mixture is stored in a glass bottle. When tested after about a month of storage, at room temperature, its pH is 6.56 and it is found to contain about 0.04 weight percent of silica.

EXAMPLE 11

Another suitable cleaning agent is made by mixing 2 fluid ounces of blackstrap molasses and 1 quart of warm water. 3cc of 40% formol is added, followed by ¼–¾ fluid ounce of a saponin solution (made by bringing to a boil 5 grams of soap bark in one quart of water and cooling). The product is a distinctly acidic liquid.

EXAMPLE 12

One-fourth fluid ounce of the silica-containing liquid made in Example 10 is mixed with the whole product of Example 11, the mixture is filtered through filter paper (No. 5 Whatman) and diluted with water to raise its pH to about 6.5.

Steel is treated with the resulting mixture, as in Example 3, with similar results.

EXAMPLE 13

In this Example there is used commercial rolled sheet zinc still carrying the polymeric coating used as a lubricant for rolling. Three strips from the same sheet are used. (a) One strip is directly placed into dilute sulfuric acid; gas is evolved and the strip disintegrates in a short time. (b) The second strip is placed in a bath of a liquid formed by diluting the red brown mixture of Example 2 about a thousandfold with water, then rinsed with tap water and placed in another sample of the same dilute sulfuric acid; here too gas is evolved and the strip disintegrates in a short time. (c) The third strip is placed for 2¼ minutes into a bath of a liquid formed by diluting the silica-containing liquid of Example 10 about fiftyfold with water, then rinsed with water and placed in another sample of the same dilute sulfuric acid; there is substantially no attack on the metal or evolution of gas, but the surface of the metal turns black (which may be due to an interaction between the sulfuric acid and the polymeric coating).

EXAMPLE 14

Example 11 is repeated, substituting beet sugar molasses (Steffens molasses) for the blackstrap molasses.

EXAMPLE 15 a. Example 1 is repeated, using 5 grams of silica flour (of a size passing through an 80 mesh sieve and retained on a 120 mesh sieve; sieves are U.S. Standard) and 1 quart of tap water in the percolator, percolating being continued for 30 minutes to produce a cloudy liquid which is clarified by filtering it through Whatman Filter paper No. 54 carrying a small quantity of a filter aid (such as the diatomaceous earth known as Celite Standard Super-Cel).

b. (1) 5 grams of powdered Quillaja Bark is steeped in one quart of cold tap water for 3 hours. The resulting red liquid is filtered e.g. through Whatman No. 1 filter paper carrying a small amount of filter aid (such as the diatomaceous earth known as Celite Standard Super-Cel).

b. (2) 5 grams of powdered Quillaja Bark is steeped in one quart of cold tap water for one hour. The mixture is then heated to the boil and kept at the boil for 30 to 45 minutes and then filtered as in Example 15 *b* 1.

c. One cc of the filtered liquid of a and 5 cc of the filtered liquid of *b* (1) or (2) are mixed with one gallon of tap water. The resulting mixture is then further diluted by mixing one cc thereof with one gallon of tap water.

d. The diluted mixture of Example 15 *c* is used to treat a pad of steel wool (4/0 fine grade, shaved from cables and heavily coated with the oil used as a lubricant for the shaving operation) by immersing the latter in the mixture. In less than 1 minute this treatment substantially removes the oil coating from the steel wool. After about two minutes of treatment the steel wool pad is removed and rinsed in hot water. The resulting product does not tend to retain moisture (it has a hydrophobic surface), it retains its original appearance and resilience in repeated use for scrubbing in water, even in conjunction with household scouring powders, and is highly resistant to attack by acids. Similar results are obtained when the diluted mixture of Example 1 *c* is diluted with 2 or 3 times its volume of tap water before immersion of the steel wool therein. Similar results are obtained on treatment of commercial household steel wool scouring pads (such as products of American Steel Wool Co. and Supreme Steel Wool made by Brillo). Immersion of a piece of commercial uncleaned flat steel instead of steel wool gives similar results, as does immersion of pieces of aluminum, of copper and of tin-plated steel. When the same treatment is applied to a piece of zinc (of over 99% purity) the rinsed product remains bright and not visibly attacked on submersion thereof in either 15% aqueous HCl or 15% aqueous $H_2SO_4$ for 7 days.

Instead of using tap water, or distilled water, for forming the silica dispersion, it is within the broader scope of this invention to use the dilute aqueous solutions (e.g. of gallic acid and the other acids or derivatives thereof) that are used (for contact with ores) in said U.S. Pat. No. 3,758,508; that is, said solutions are used, in place of tap water, to contact the silica.

It is also within the broader scope of this invention to use, in place of the pure silica, a siliceous mineral containing metal compounds, to form a colloidal silica dispersion similarly containing dispersed or dissolved metal compounds. In this case, as in the U.S. Pat. No. 3,758,508 the metal treated with the aqueous dispersion tends to turn color, generally assuming the characteristic color of the dispersed or dissolved metal compound.

With respect to the treated metal disclosed in said U.S. Pat. No. 3,758,508 it has also been found that it lends itself very well to electroplating. In one series of tests, samples thereof were cleaned in an acidic cleaning bath, of the type conventionally used prior to electroplating, and then electroplated under commercial conditions with brass, cadmium and chromium; in each case the plated sample was found to be unusually resistant to corrosion.

Another aspect of this invention relates to the provision of treated substrates which can be readily converted to catalysts or chemical reagents for various purposes. Supported catalysts and reagents, comprising metal compounds, such as oxides (e.g. CuO), on various inorganic supports, such as granular silica or alumina etc., are well known in the art. For instance supported CuO is known as a desulfurizer of oils and iron oxide in "sponge" form is used to remove sulfurous substances from various gases. In accordance with this aspect of the invention a siliceous ore, or other mineral or mixture of minerals, containing silica and a heavy metal compound is leached with water to obtain a liquid containing dispersed silica as well as dispersed metal compound. The ore or mineral used as the starting material is conveniently in a form having a relatively high surface area, for instance in the form of a fine powder (e.g. of a particle size to pass through a 325 mesh U.S. Standard screen) or a fine granular material. The resulting liquid is applied to the substrate, without the need for any pretreatment of the latter, yielding a product having on its surface a metal hydroxide (or sulfide or other compound) derived from the liquid. On heating to suitable temperatures well known in the art the surface metal compound is converted to the corresponding oxide.

The substrate may be any solid inorganic material. Suitable substrates are disclosed in the aforesaid U.S. Pat. No. 3,578,508. Thus I have found that I can use various rocks, steel chips, steel wool, etc. Particularly useful is chrysotile tailings which is the rocky residue remaining after chrysotile asbestos fibers are removed from the crude chrysotile rock ore; this material (which is readily available as a waste product from producers of chrysotile asbestos) has a low density and a high porosity and is resistant to attrition. The substrate may be basic, acidic or neutral, basic substrates being preferred. The substrate may be conveniently treated by immersing it in the liquid for a period of suitable period time to effect the desired impregnation or surface treatment. For relative non-porous materials and when only a surface coating is needed it is often preferable to use a more concentrated liquid (obtained for example by evaporating off a portion (e.g. about one half) of the water thereof. In one preferred treatment technique the substrate is subjected to subatmospheric pressure to reduce its content of water and other volatile liquid and then subjected to the treating liquid, preferably under superatmospheric pressure.

The leaching of the ore or other mineral can be effected in a manner similar to the leaching of the silica as described above, e.g. by simply soaking it in water at room temperature or at elevated temperature, followed (preferably) by filtering of the liquid (as through ordinary filter paper) to remove particles of solids. The ore, after leaching, can generally be employed in the usual manner; thus, it may be treated to recover its metal content.

Mixtures of liquids obtained from different ores may be used to produce deposits of mixed metal compounds.

The following Examples are given to illustrate the invention further.

EXAMPLE C1

50 grams of powdered chromite ore of −325 mesh particle size (as in Example 1 of said U.S. Patent No. 3,578,508) is mixed with one quart of tap water and heated at the boil for ½ hour. The mixture is then cooled, and filtered, and sufficient water is added to make the volume 1 quart, giving a clear colorless liquid which, on analysis, is found to contain chromium and iron; on evaporation to dryness the weight of residue is 0.03% of the weight of liquid. Granules of chrysotile tailings (of a size to pass an 8 mesh sieve and be retained on a 14 mesh sieve) are immersed for ½ hour in this liquid. The granules are removed, most of the loosely adhering liquid is drained off (through a strainer) and the material is allowed to dry in air. It exhibited a bluish tint characteristic of chromium (-ous) hydroxide.

EXAMPLE C2

Example C1 is repeated, using gray crushed rock instead of the chrysotile tailings. A bluish tinted product is obtained.

EXAMPLE C3

Example C1 is repeated, using steel wool in place of the chrysotile tailings. A brownish black product is obtained.

EXAMPLE C4

Example C1 is repeated, using finely powdered magnetite (as in Example 4 of my U.S. Pat. No. 3,578,508) in place of the chromite. The clear colorless liquid is found to contain a small amount of iron; on evaporation to dryness the weight of residue is found to be 0.05% of the weight of liquid. The treated chrysotile tailings has a greenish color characteristic of ferrous hydroxide.

EXAMPLE C5

Example C4 is repeated using crushed rock and concentrating the liquid, by evaporation, to half its volume before contacting it with the rock. A white product is obtained.

EXAMPLE C6

Examples C1, C2 and C3 are repeated using copper ore (e.g. crude malachite). The clear colorless liquid is found to contain copper and sulfur; the residue, on evaporation to dryness is in this case 0.02%. In the case of steel wool, a black product is obtained.

EXAMPLE C7

Examples C1, C2 and C 3 are repeated using yellow ochre in place of the chromite. The clear colorless liquid is found to contain a small amount of iron; the residue, on evaporation to dryness, is 0.06% in this case.

EXAMPLE C8

Examples C1, C2 and C3 are repeated using commercial molybdenite in place of the chromite. The yellow liquid is found to contain molybdenum and sulfur; the residue, on evaporation to dryness, is 0.16%.

In the Examples given herein, all pH measurements are made with a glass combination electrode and a Beckmann pH meter, when filtering is mentioned it is carried out with Whatman No. 5 filter paper, all sieve sizes are U.S. Standard; and all water is New York City tap water.

It is also within the scope of this invention to incorporate tannin into the treating solution before it is applied to the substrate. This imparts to the catalyst such properties as an increased resistance to chemical attack (e.g. by acids or alkalis), a surface having decreased wettability by water (e.g. a hydrophobic surface), etc. For example one may modifiy each of the foregoing Examples C1 to C8 by adding the Quillaja extract described in Example 15 *b* (1) or (2) to the solution to be used for treating the substrate. Only a small amount of the tannin is needed, such as the addition of less than one part (e.g. one half part) of the solution of Example 15 *b* (1 or 2) to 1000 parts of any of the filtered treating solutions used in Examples C1 to C8.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

I claim:

1. Process for treating metal surfaces to improve their resistance to chemical attack which comprises bringing said surfaces into contact with an aqueous composition consisting essentially of a colloidal disperison of silica and tannin and removing said metal surface from contact with said composition before any deposit of silica visible to the naked eye is formed on said surface.

2. Process as in claim 1 in which said composition also contains a surfactant.

3. Process as in claim 1 in which the period of said contact is less than an hour.

4. Process as in claim 1 in which the concentration of silica in said dispersion is up to about 0.04%.

5. Process as in claim 1 in which said composition contains dissolved sucrose and saponin.

6. Process as in claim 1 in which said composition also contains saponin.

7. Process as in claim 6 in which said composition contains water extract of quillaja bark.

8. Process as in claim 1 in which said metal is ferrous metal, zinc, aluminum, copper and silver.

9. Product of the process of claim 8, said product having a hydrophobic surface.

10. Product of the process of claim 1.

* * * * *